E. H. ANGIER AND W. M. WHEILDON.
WRAPPING MACHINE.
APPLICATION FILED MAR 10, 1917.
1,432,009.
Patented Oct. 17, 1922.
2 SHEETS—SHEET 2.
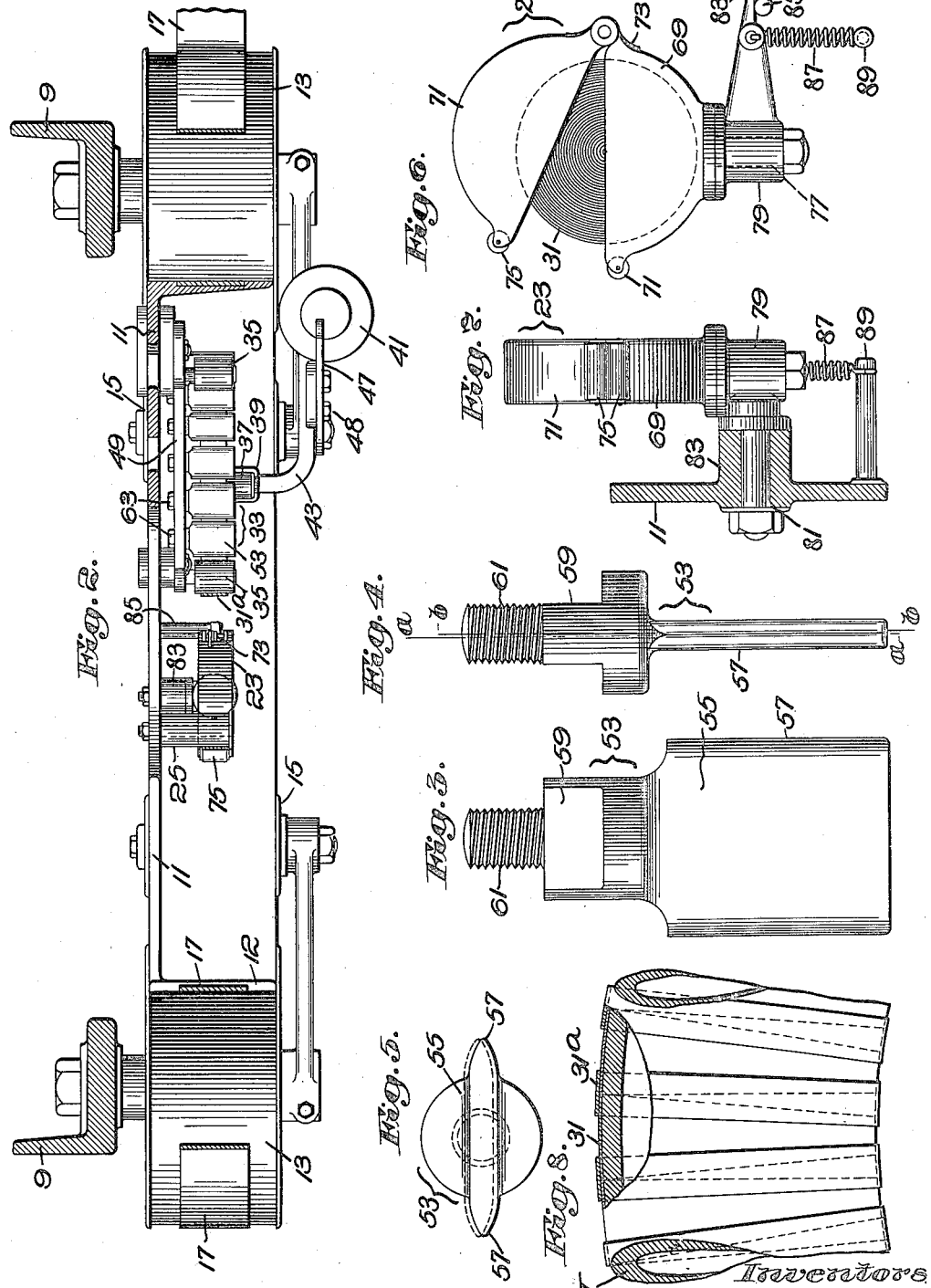
Inventors
Edward H. Angier.
William M. Wheildon.
Emery, Booth, Janney + Varney
Attys.

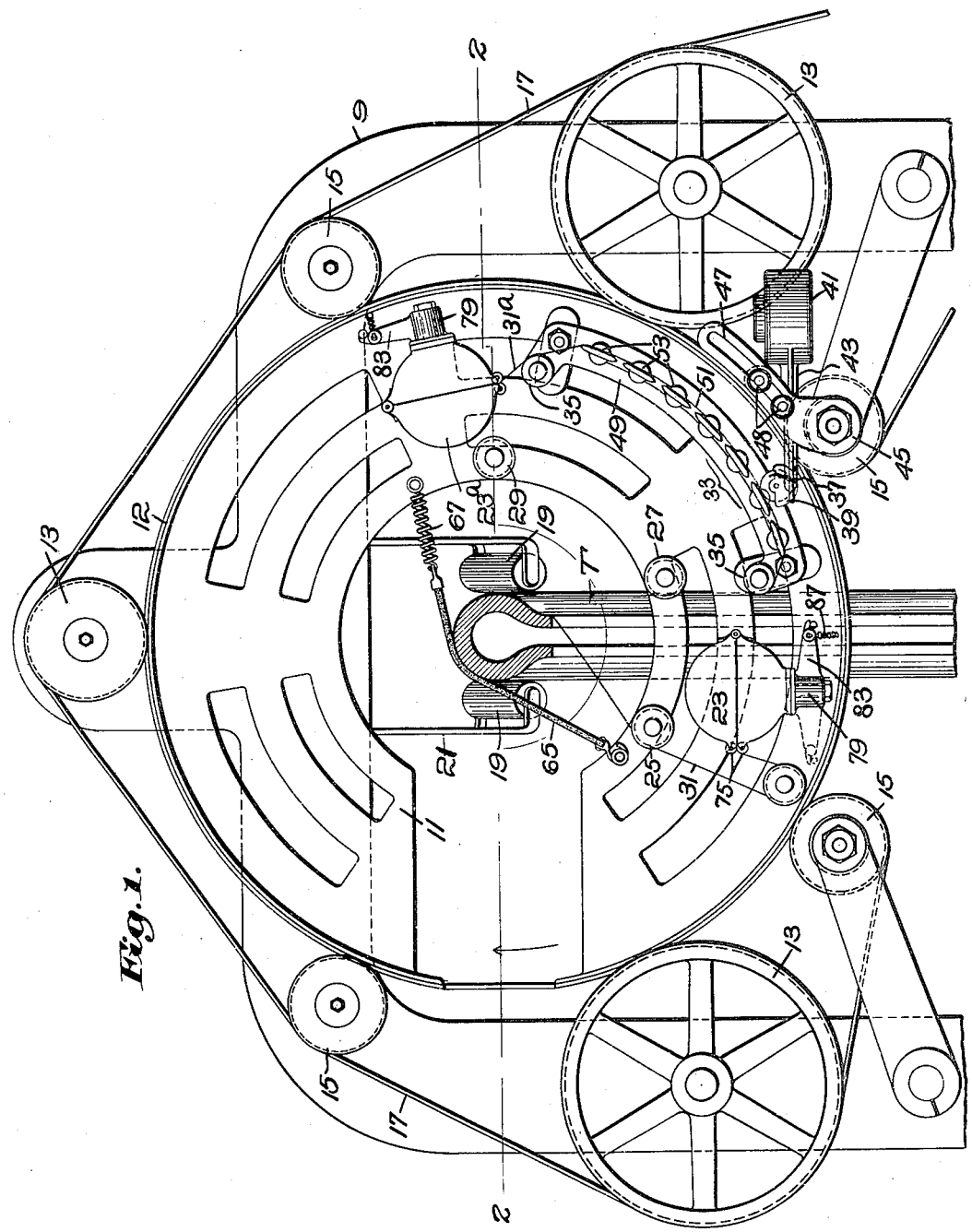

Patented Oct. 17, 1922.

1,432,009

UNITED STATES PATENT OFFICE.

EDWARD H. ANGIER, OF FRAMINGHAM, AND WILLIAM M. WHEILDON, OF ASHLAND, MASSACHUSETTS, SAID WHEILDON ASSIGNOR TO SAID ANGIER.

WRAPPING MACHINE.

Application filed March 10, 1917. Serial No. 153,992.

*To all whom it may concern:*

Be it known that we, EDWARD H. ANGIER and WILLIAM M. WHEILDON, citizens of the United States, and residents, respectively, of Framingham and Ashland, in the county of Middlesex and Commonwealth of Massachusetts, have invented an Improvement in Wrapping Machines, of which the following description, in connection with the accompanying drawings, is a specification, like characters on the drawings representing like parts.

This invention relates to wrapping machines and in particular to that type of machine adapted to wrap annular articles, such as the casings of pneumatic vehicle tires, with paper applied helically therearound. In the present application we have illustrated a tire wrapping machine and for conciseness shall refer to a tire using the word in an exemplary sense. It will be understood that our invention is applicable to the wrapping of other articles of form similar to that of a tire.

Our invention will best be understood by reference to the following description taken in connection with the accompanying drawings, wherein,—

Fig. 1 is an elevation of the upper portion of a machine embodying our invention;

Fig. 2 is a section on the line 2—2 of Fig. 1, the tire and presser device as well as the parts of the machine which are broken away in Fig. 1 being omitted for the sake of clearness;

Figs. 3, 4 and 5 are a plan and side and end elevations, respectively, of a member used as an element of our improved machine;

Fig. 6 is a side elevation of the receiver for the paper supply with the cover lifted;

Fig. 7 is an end elevation of the same with the cover closed, the view being from the left of Fig. 6; and Fig. 8 is a broken-away view of a portion of a tire with a form of wrapping thereon which may be applied by the machine illustrated.

Referring to Fig. 1, the machine shown embodies a suitable framework 9. We provide a rotary shuttle comprising a substantially annular plate 11 formed with a cylindrical flange 12 engaged by flanged wheels 13 carried by the frame 9 and which support the shuttle so that it "floats." Trained around the wheels 13 and any suitable number of additional guide pulleys 15 is a belt 17 connected to a driving pulley not shown, the part of the belt leading to the driving pulley appearing broken at the right-hand side of Fig. 1. The belt 17 engages the exterior of the flange 12 of the shuttle throughout a substantial portion of its extent and thus rotates the same in the direction of the arrow at the left in Fig. 1. The body of the shuttle is cut away at one side to permit the introduction of a tire T which is supported as shown by suitable guide rolls 19 which may be carried on brackets 21 depending from frame 9 and any suitable number of additional rolls engaging the tire at the lower part of its periphery and not here illustrated. Some of these rolls may be positively driven, as is well understood in the art, to revolve the tire in the direction of the arrow in Fig. 1.

Suitable means are carried by the shuttle for supplying paper strip or other wrapping material to the tire. Paper is the material ordinarily used, and for brevity we shall refer to paper as exemplary of suitable wrapping material. We have here shown two receivers for rolls of paper, 23 and 23ª, carried by the shuttle, these receivers preferably being of the form illustrated and which we shall hereafter describe in detail. Guide rolls 25, 27 and 29 are also carried by the shuttle. If, for example, the strip of paper 31 is led from the receiver 23 over the roll 25 and applied to the tire, it will be understood that when both tire and shuttle are rotated the paper supply and tire will relatively move in a helical path and the strip will be drawn out from the supply and wrapped helically about the tire. This general mode of operation is in itself well known.

An important feature of our invention consists in means which we provide for treating the paper which is applied to the tire. The means illustrated in the present embodiment is adapted to apply adhesive to the paper or moisten paper which already has adhesive thereon, so that the wrapping may be sealed about the tire. For convenience we shall first describe the operation of the paper-treating device in connection with the use of a single strip of wrapping paper such as the strip 31ª leading from receiver 23ª.

In accordance with our invention we provide a supporting surface denoted generally by the numeral 33 and disposed along an arc concentric with the shuttle. We shall postpone for the present the description of the detailed construction of the surface herein disclosed. The paper strip 31ª may be trained, as shown, over the surface 33, guide rolls 35 being provided if desired, and thence over roll 27 to the tire. The paper, as it is drawn off onto the tire by the revolution of the shuttle, will pass over the surface 33. Presented adjacent the shuttle and in position to act upon the paper held by the supporting surface 33, is a paper-treating device herein illustrated as a dauber consisting of a roll 37 revolving in a cup 39 containing, for example, a suitable adhesive, which cup is supplied from the reservoir 41 through a conduit 43. This device is adjustably mounted adjacent the shuttle on a bracket 45 supported from frame 9 of the machine. The bracket 45 preferably has the arc-shaped slot 47 concentric with the shuttle and adapted to receive the adjusting bolts 48 secured to the paper-treating device. By movement of the adjusting bolts in the slot, the position of the roll 37 may be varied.

By the means described it will be apparent that each time the shuttle revolves the roll 37 or other dauber will wipe over the length of paper supported by the surface 33, and this length of paper will be coated with adhesive or otherwise treated. If the length of the surface 33 is as great as the length of the paper required to make one convolution about the tire, the entire wrapping will be treated and each convolution may be sealed to the next so as to form a tight covering. In the example shown a restricted portion of the edge (see Fig. 2) of the inner surface of the strip 31ª will be acted upon and each succeeding convolution may be fastened down to the one preceding.

To permit adjustment of the device to various sizes of tires, the surface 33 is preferably made so that its extent may be varied. For this and other purposes we preferably utilize the construction illustrated in the present drawing, and which we shall next proceed to describe. Referring first to Figs. 1 and 2, we there show an arc-shaped plate 49 secured to the shuttle, conveniently by means of bolts and spacing and clamping plates as illustrated (Fig. 2). The plate 49 may have terminal ears carrying the rolls 35 already referred to. In the plate is formed a slot 51 in which are mounted a series of members 53 shown in detail in Figs. 3, 4 and 5. Referring to those figures, each of the members 53 comprises a markedly oblate body portion 55 having opposite flat faces and tapered and rounded side edges 57. Each member also has a portion 59 adapted to fit the slot 51, and from this portion 59 may extend a threaded stud 61 adapted to receive the nut 63 to clamp the member in place. Referring particularly to Fig. 4, the center line of the parts 59 and 61 is there marked with the letter $a$ and the center line of the part 55 with the letter $b$. It will be seen that the supporting part 55 is offset as regards the attaching part 59 and is not located symmetrically as regards the slot 51 when it is in position. In Fig. 5 we have shown in dotted lines the position that the part 55 would occupy were it turned through a half revolution from the full line position. The purpose of this construction will presently appear. The members 53 are placed with the edges 57 adjacent and form essentially a continuous supporting surface for the paper strip. By removing certain of the members or by slightly altering their spacing, the effective extent of the supporting surface 33 can be varied and the length of paper which will be treated by the dauber 37 on each revolution of the shuttle will be correspondingly varied. The construction described, furthermore, provides for application of adhesive to the paper at spaced points, since the strip 31ª may be interwoven among the several members 35 so that in the revolution of the shuttle those parts of the paper which are on one side of the set of members 53 will be treated while the parts which lie beneath others of the members will not be. When it is desired to interweave the paper with the members 53, certain of them may be turned upside down relatively to the rest, and because of the offsetting of the supporting parts 55 relative to the parts 59 which enter the positioning slot, the strip of paper will not be subjected to sharp bends which would impede its draft from the receiver 23ª and tend to cause breakage. The rounded and tapered edges 57 cooperate in preventing breakage of the paper and permitting its easy running. It will be understood that the paper strip can be run above and beneath the several members in any desired combination, and the treatment of the paper thus adapted to a wide variety of uses. For example, the successive convolutions of the wrapper can be secured together at the tread or adjacent the beads instead of all the way around, or adhesive can be applied to the convolutions at the tread portion in readiness to receive a circumferential binding strip encircling the wrapping at the tread of the tire.

While the liquid containing reservoir 41 herein shown is not in a strict sense stationary, it is stationary as regards the motion of the shuttle and the other parts of the machine in the sense of not partaking thereof and it is not moved as a part of the regular operation of the machine. It may thus be made of any desired size to contain a large supply of liquid. The shuttle is light and easily moved and the difficulties due to centrifugal force which would arise if it were attempted to carry liquid on the shuttle are avoided.

The supporting surface thus described in detail and denoted generally by the numeral 33, is preferably located between the two paper receivers 23 and 23ª when the two are used. The strip 31ª can be led from the receiver 23ª over the supporting surface and the roll 27, and thence to the tire, or the strip 31 can be led from a receiver in the position of the receiver 23, but conveniently faced the opposite way as indicated by dotted lines, over the supporting surface and the roll 29 and used to wrap the tire. In the first case the inner face of the paper is treated, in the second the outer face. Preferably, however, we utilize two strips, the strip 31ª leading from the receiver 23ª over the supporting surface and the roll 27, as shown, and the strip 31 leading from the receiver 23 over roll 25. The strip 31 may conveniently be a wider strip than the strip 31ª, as is indicated in Fig. 8 which shows a tire T wrapped with two strips by this machine. As is there seen the convolutions of the strips break joint and instead of having a tire wrapped by a single strip with a considerable overlap between successive convolutions of the strip, the strip 31 may be applied so that its edges abut or are slightly spaced and the second strip 31ª will overlie the joints between the convolutions of strip 31 and, if desired, may be secured thereto to seal the package. By utilizing two strips in this manner, considerable economy in paper may be effected over the use of a single strip which necessitates a large overlap. Furthermore, ornamental effects may be obtained by using strips of different colors which might also have a trade-mark significance.

Means are provided for pressing together the successive convolutions of the paper strip or strips as they are applied to the tire to cause them to adhere one to another. In the present instance, we show a presser device comprising a flexible band 65 of felt or the like, stretched across the central opening of the annular shuttle 11 and secured by means of a spring 67 in such manner that it tends to assume a chord-like position across the annulus. The presser is displaced against the force of the spring 67 by the tire T, as shown in Fig. 1, and in the revolution of the shuttle will follow around the tire after the strips 31 and 31ª, pressing them together against the tire. Because of its flexible nature it is at all times in contact with a considerable area of the tire and, as it were, irons out the wrapping, assuring its close application as well as providing for sealing the elements thereof together. Since this presser device is efficient to tension the strips about the tire, they may be arranged to feed very loosely from the receivers 23 and 23ª so that there is little danger of breakage under draft. In structures of the prior art the speed of the mechanism was limited because the resistance of the paper to feeding movement was depended upon to effect the close application of the wrapping, and the tensile strength of a long strip of paper was, of course, quite limited. In the present instance, the only substantial tensioning pull on the paper takes place on the tire itself and the resistance of the paper to feeding from the shuttle need only be so great as to prevent its unwinding spontaneously faster than it can be used.

While any convenient means may be employed for storing paper in the shuttle, we preferably use the device illustrated in detail in Figs. 6 and 7. The receiver 23 there shown comprises upper and lower semi-cylindrical members 69 and 71 hinged together at one side. The member 71 forms a lid which is normally held closed by the spring 73 located at the hinge. At the side of the closure opposed to the hinge the members are cut away to form an opening corresponding to one element of the cylinder, and anti-friction means in the form of rollers 75 may be provided at opposite sides of this opening. The receiver 23 is adapted loosely to receive a roll of paper in the manner indicated in Fig. 6, and the end of the paper will pass between the rolls 75 for use in the manner shown in Fig. 1. When it is desired to renew the supply of paper it is necessary only to raise the cover 71 and insert a new roll, no careful adjustments being required.

From the section 69 of the receiver there extends a stud 77 journaled in a box 79 which in turn carries a stud 81 at right angles to the bearing receiving the stud 77 and arranged to be journaled in a lug 83 on the shuttle 11. The lug 79 may have an extension 83 adapted to be pressed against the stop 85 by a spring 87, which is secured to a pin 89 on the shuttle 11, thus normally holding the receiver in the position shown in Fig. 1.

It will be seen that the structure just described provides for universal pivoting of the receiver. The latter is, therefore, permitted to adjust itself so that the strip is drawn therefrom to the tire with even tension instead of possibly being pulled more at one edge than at another and it, therefore, will lie smooth. Furthermore, if for any reason there should be an excessive draft on the paper, the receiver can rock on pivot stud 81 against the force of the spring 85 and thus take up the strain and prevent the strip from snapping.

We have described in considerable detail the embodiment of our invention herein shown and the various parts illustrated. While an organization embodying the various specific structures illustrated and described is particularly desirable, it will be understood that various of the features mentioned can be utilized in connection with other constructions, and furthermore that although we have specifically named the various mechanical elements in which our invention is embodied, structures considerably different in form could be utilized without departing from its spirit. What we claim and desire to secure by Letters Patent is:

1. In a machine of the class described, a rotary shuttle embodying paper supply means and a paper supporting surface to receive paper on its way to the article, and a liquid container adjacent the shuttle, which is stationary in the sense that it does not partake of the motion of the shuttle and having associated therewith liquid applying means presented adjacent said supporting surface to apply liquid to the paper as it lies thereon.

2. In a machine of the class described, a rotary shuttle embodying paper supply means and a concentric arc-shaped supporting surface, and a liquid container adjacent the shuttle, which is stationary in the sense that it does not partake of the motion of the shuttle and having associated therewith liquid applying means presented to said surface for contact with paper thereon.

3. In a machine of the class described, strip supply means, a rotary carrier for bodily revolving the same about an axis exterior thereto, a non-rotary liquid reservoir and means for applying liquid from said reservoir continuously throughout the entire length of the strip as it is drawn from said supply by the revolution thereof.

4. In a machine of the class described, strip supply means, a rotary carrier for bodily revolving the same, a liquid applying device, means on the shuttle for holding the strip to permit the entire length thereof to make contact with said device as the strip is drawn from the supply by the revolution thereof and a non-rotary liquid reservoir arranged to supply liquid to said applying means.

5. In a machine of the class described, a rotary shuttle embodying paper supply means and a concentric arc-shaped supporting surface adjustable as to length, and a liquid container adjacent the shuttle, which is stationary in the sense that it does not partake of the motion of the shuttle and having associated therewith liquid applying means presented to said surface for contact with paper thereon.

6. In a machine of the class described, means for positioning an article, a rotary shuttle having strip supply means, a liquid applying device which is stationary in the sense that it does not partake of the motion of the shuttle and means for supporting the strip to cause the same to move longitudinally in contact with said liquid applying device as the strip passes from the supply to the article.

7. In a machine of the class described, means for positioning an article, a rotary shuttle having strip supply means and a guide over which the strip runs and from which it is led to the article and liquid-applying means which is stationary in the sense that it does not partake of the motion of the shuttle and is arranged to make contact with said strip before it passes over the guide.

8. In a machine of the class described, means for positioning an article, a rotary shuttle having strip supply means and a liquid reservoir which is stationary in the sense that it does not partake of the motion of the shuttle having a liquid-applying device arranged to wipe longitudinally along the strip.

9. In a machine of the class described, paper supply means, supporting means for an annular article, means to effect relative helical movement between the article and supply means, a support for the paper on its path from the supply to the article, having a series of portions adapted each to receive the paper on either side thereof in desired combination with the rest, and a device to treat the portions of the paper presented at one side of the support.

10. In a machine of the class described, a rotary shuttle embodying paper supply means and a paper supporting surface, having a series of portions each adapted to receive the paper on either side thereof in desired combination with the rest, and a device presented adjacent said shuttle to treat the portions of the paper presented at one side of the support.

11. In a machine of the class described, a rotary shuttle embodying paper supply means and supporting means for the paper, including a series of parts arranged to permit interweaving of the paper therewith, said parts being individually adjustable whereby sharp bends of the interwoven paper may be eliminated, and a device presented adjacent said shuttle to treat the paper at one side of the several parts.

12. In a machine of the class described, a rotary shuttle, paper supply means carried thereby, said shuttle having an attaching portion disposed in an arc, members having portions adapted to be secured to the same, and bodies offset relatively to said securing portions.

13. In a machine of the class described, a rotary shuttle, paper supply means carried thereby, said shuttle having an attaching portion disposed in an arc, members having portions adapted to be secured to the same, and flat bodies tapered at either side and offset relatively to the securing portions.

14. An element for use in a machine as described, having a markedly oblate body portion tapering to side edges, and a securing portion offset relatively to said body portion.

15. In a machine of the class described, means for supporting an annular article, a rotary shuttle and a support for a paper roll carried by said shuttle and arranged to permit universal swinging of the axis of said roll in two planes in response to the tensional pull of the paper thereon.

16. In a machine of the class described, means for supporting an annular article, a rotary shuttle, and a support for a paper roll carried by said shuttle, spring positioning means therefor, said support being mounted for universal swinging movement against said spring positioning means in response to the tensional pull of the paper thereon.

17. In a wrapping machine, a ring-like shuttle arranged to rotate about an article and having means to carry a wrapping strip thereabout and a presser device carried by the shuttle and comprising a flexible band engaging the article and deflected by the latter between its ends.

18. In a wrapping machine, a ring-like shuttle arranged to rotate about an article and having means to carry a wrapping strip thereabout and a presser device carried by the shuttle and comprising a yieldably mounted flexible band engaging the article and deflected by the latter between its ends.

19. In a machine for wrapping articles, a ring-like shuttle arranged to rotate about the article and having means to carry a wrapping strip thereabout, and a presser device extending chord-like across said shuttle and adapted to be wiped about the article in the movement of the shuttle.

20. In a machine for wrapping articles, a ring-like shuttle arranged to rotate about the article and having means to carry a wrapping strip thereabout, and a yielding presser device normally tending to assume a chord-like position across said shuttle and adapted to be wiped about the article in the movement of the shuttle.

21. In a machine for wrapping articles, a ring-like shuttle arranged to rotate about the article and having means to carry a wrapping strip thereabout, and a presser device comprising a flexible strip spring drawn toward a chord-like position across said shuttle and adapted to be wiped about the article in the movement of the shuttle.

22. A machine of the class described, comprising, in combination, a rotary shuttle, two paper supply devices carried thereby, a paper supporting surface between said devices, and means for applying liquid to paper from either device when supported on said surface.

23. In a machine of the class described, paper supply means, supporting means for an annular article, means to effect relative helical movement between the article and supply means, and means arranged to apply liquid to spaced locations along the paper as it passes to the article, said means being adjustable to permit variation of said locations.

In testimony whereof, we have signed our names to this specification.

EDWARD H. ANGIER.
WILLIAM M. WHEILDON.

Certificate of Correction.

It is hereby certified that in Letters Patent No. 1,432,009, granted October 17, 1922, upon the application of Edward H. Angier, of Framingham, and William M. Wheildon, of Ashland, Massachusetts, for an improvement in "Wrapping Machines," an error appears in the printed specification requiring correction as follows: Page 4, line 51, claim 3, strike out the word "thereof" and insert the words *of the carrier;* and that the said Letters Patent should be read with this correction therein that the same may conform to the record of the case in the Patent Office.

Signed and sealed this 28th day of November, A. D., 1922.

[SEAL].
KARL FENNING,
*Acting Commissioner of Patents.*